United States Patent [19]
Miller et al.
[11] Patent Number: 5,030,281
[45] Date of Patent: Jul. 9, 1991

[54] RECORD MATERIAL

[75] Inventors: Robert E. Miller; Steven L. Vervacke; Timothy J. Bahowick; Kenneth D. Glanz, all of Appleton, Wis.
[73] Assignee: Appleton Papers Inc., Appleton, Wis.

[21] Appl. No.: 396,168
[22] Filed: Aug. 21, 1989

Related U.S. Application Data

[62] Division of Ser. No. 171,983, Mar. 23, 1988, Pat. No. 4,880,766.

[51] Int. Cl.$^5$ .......... C09D 11/00
[52] U.S. Cl. .......... 106/21; 503/212; 503/216; 503/225
[58] Field of Search .......... 106/21; 503/212, 216, 503/225; 428/913, 914

[56] References Cited

U.S. PATENT DOCUMENTS

| | | | |
|---|---|---|---|
| 3,874,895 | 4/1975 | Hayashi et al. | 503/225 |
| 4,134,847 | 1/1979 | Oda et al. | 503/225 |
| 4,173,684 | 11/1979 | Stolfo | 106/21 |
| 4,566,007 | 1/1986 | Kagota | 106/21 |
| 4,573,063 | 2/1986 | Miller et al. | 503/225 |
| 4,604,436 | 8/1986 | Thorpe et al. | 503/212 |
| 4,610,729 | 9/1986 | Bodmer et al. | 503/225 |
| 4,612,254 | 9/1986 | Ginter et al. | 503/225 |
| 4,620,874 | 11/1986 | Booth, Jr. et al. | 106/21 |

FOREIGN PATENT DOCUMENTS

| | | |
|---|---|---|
| 0005975 | 12/1979 | European Pat. Off. . |
| 2348639 | 4/1974 | Fed. Rep. of Germany . |
| 235674 | 5/1977 | France . |
| 58-69595 | 5/1984 | Japan . |
| 58-69596 | 5/1984 | Japan . |
| 58-186974 | 7/1985 | Japan . |
| 2126364 | 8/1983 | United Kingdom . |

*Primary Examiner*—Mark L. Bell
*Assistant Examiner*—Helene Klemanski
*Attorney, Agent, or Firm*—Paul S. Phillips, Jr.; Benjamin Mieliulis

[57] ABSTRACT

A color developer material comprising a homogeneous mixture of a color developer containing a certain weight percent phenolic group, divalent zinc, and an aromatic carboxylate component possessing certain properties. These mixtures are particularly useful as color developer materials for basic chromogenic materials in either pressure-sensitive or heat-sensitive record materials.

18 Claims, No Drawings

RECORD MATERIAL

This application is a division of application Ser. No. 07/171,983 filed Mar. 23, 1988, now U.S. Pat. No. 4,880,766.

This invention relates to the production of novel record material. More specifically, the invention involves sensitized record sheet material useful in developing dark-colored marks on contact with colorless solutions of basic chromogenic material (also called color formers). Such sheet material includes color developer material generally in the form of a coating on at least one sheet surface. The coating of color developer material serves as a receiving surface for colorless, liquid solutions of color formers which react, on contact, with the color developer material to produce the dark-colored marks.

Pressure-sensitive carbonless copy paper of the transfer type consists of multiple cooperating superimposed plies in the form of sheets of paper which have coated, on one surface of one such ply, pressure-rupturable microcapsules containing a solution of one or more color formers (hereinafter referred to as a CB sheet) for transfer to a second ply carrying a coating comprising one or more color developers (hereinafter referred to as a CF sheet). To the uncoated side of the CF sheet can also be applied pressure-rupturable microcapsules containing a solution of color formers resulting in a pressure-sensitive sheet which is coated on both the front and back sides (hereinafter referred to as a CFB sheet). When said plies are superimposed, one on the other, in such manner that the microcapsules of one ply are in proximity with the color developers of the second ply, the application of pressure, as by typewriter, sufficient to rupture the microcapsules, releases the solution of color former and transfers color former solution to the CF sheet resulting in image formation through reaction of the color former with the color developer. Such transfer systems and their preparation are disclosed in U.S. Pat. No. 2,730,456.

This invention also relates to thermally-responsive record material. It more particularly relates to such record material in the form of sheets coated with color-forming systems comprising chromogenic material and acidic color developer material. This invention particularly concerns a thermally-responsive record material with improved image stability and/or image intensity and/or thermal response.

Thermally-responsive record material systems are well known in the art and are described in many patents, for example U.S. Pat. Nos. 3,539,375; 3,674,535; 3,746,675; 4,151,748; 4,181,771; 4,246,318; and 4,470,057 which are hereby incorporated by reference. In these systems, basic chromogenic material and acidic color developer material are contained in a coating on a substrate which, when heated to a suitable temperature, melts or softens to permit said materials to react, thereby producing a colored mark.

U.S. Pat. No. 4,573,063, which is hereby incorporated by reference, discloses a developer composition comprising an addition product of a phenol and a diolefinic alkylated or alkenylated cyclic hydrocarbon.

U.S. Pat. No. 4,610,727, which is hereby incorporated by reference, discloses a developer composition comprising a zinc-modified addition product of a phenol and a diolefinic alkylated or alkenylated cyclic hydrocarbon.

U.S. Pat. No. 4,134,847 discloses a process for producing a color developer by heating a mixture of an aromatic carboxylic acid, a water-insoluble organic polymer and an oxide or carbonate of polyvalent metal in the presence of water. The description of the eligible water insoluble organic polymers does not include or suggest a requirement that the polymers be color developers or that they possess a certain minimum weight percent phenolic group. Furthermore, there is no disclosure or suggestion that these polymers include addition products of a phenol and a diolefinic alkylated or alkenylated cyclic hydrocarbon. The reference also does not disclose or suggest the unexpected results to be achieved from the use of an aromatic carboxylate component of particular octanol/water partition coefficient of the corresponding aromatic carboxylic acid(s) and other critical properties of the corresponding color developer material.

U.S. Pat. No. 3,924,027 discloses a process for producing a color developer composition by mixing and melting an organic acid substance selected from the group consisting of aromatic carboxylic acids and polyvalent metal salts thereof and an organic high molecular compound and further incorporating a water-insoluble inorganic material, in the form of particles, or organic material, in the form of powder. The reference does not disclose or suggest the use of addition products of a phenol and a diolefinic alkylated or alkenylated cyclic hydrocarbon. The reference, further, does not suggest the unexpected results to be achieved from the use of an aromatic carboxylate component of particular octanol/water partition coefficient of the corresponding aromatic carboxylic acid(s) and other critical properties of the corresponding color developer material.

U.S. Pat. No. 3,874,895 discloses a recording sheet containing as a color developer composition a mixture of an acidic polymer and an organic carboxylic acid or a metal salt thereof. Although the reference discloses the possibility of using two or more organic carboxylic acids, there is no teaching or suggestion of unexpected results to be obtained from the use of an aromatic carboxylate component of particular octanol/water partition coefficient of the corresponding aromatic carboxylic acid(s) and other critical properties of the corresponding color developer material.

Japanese Patent Disclosure No. 62-19486 discloses, as couplers for pressure sensitive copying paper, polyvalent metalized carboxy-denatured terpentine phenol resins obtained by polyvalent metalization of the products prepared through introducing carboxyl groups into a condensate produced by condensation of cyclic monoterpentines and phenols in the presence of acidic catalysts. The reference does not disclose or suggest the use of an aromatic carboxylate component of particular octanol/water partition coefficient of the corresponding aromatic carboxylic acid(s) and other critical properties of the corresponding color developer material.

Although aromatic carboxylic acids and combinations thereof, certain organic polymers and inorganic metal compounds have been suggested for use in color developer compositions for pressure-sensitive carbonless copy paper, the compositions suggested have failed to overcome certain existing problems in carbonless copy paper or have proven to have defects of their own which make them unattractive as color developers in commercial carbonless copy paper systems.

Applicants have discovered several problems of color developer material, the solutions of which require the simultaneous combination of certain physical and chemical characteristics of the material. For this reason, applicants have determined that a combination of certain tests and properties of components of the color developer material will impart unexpectedly superior performance to the resulting color developer materials which successfully pass all of these tests and properties.

Among the problems in carbonless copy paper systems which previously-suggested developer compositions have failed to overcome are wet stability, solvent desensitization, solvent resistance, CF decline, image stability, reduced color-forming efficiency and color former solvent solubility.

Among the problems in thermally-responsive record material which previously-suggested developer materials have failed to overcome are enhanced image intensity, adequate thermal response and adequate stability of images to skin oils, etc.

Certain developer compositions, when exposed to water for an extended period of time, particularly in combination with elevated temperatures, show a reduced ability to produce an image of satisfactory intensity. Resistance to the reduced ability to produce satisfactory image intensity is called wet stability.

Coatings of certain developer compositions, when exposed to liquid or vapor of certain solvents, show a reduced ability to produce an image of satisfactory intensity and/or a reduced rate of image development. This tendency is described as solvent desensitization. Since the source of such solvents can be ruptured microcapsules from the microcapsular coating on a CFB sheet, this tendency is also referred to as the CFB effect.

The presence of solvents in a color-forming composition including a color former and certain developer compositions can result in reduced image development. Resistance to this effect is referred to as solvent resistance.

Coatings of certain developer compositions when exposed to light and/or heat show a reduced ability to produce an image of satisfactory intensity. This tendency is described as CF decline.

Developer compositions vary in the amount of color which can be produced per unit weight of color former material. This property is called color-forming efficiency.

Since the color-forming reaction is a solution reaction which takes place in the color former solvent, adequate solubility of the color developer in this solvent is a prerequisite to obtaining satisfactory image intensity.

In the field of thermally-responsive record material, thermal response is defined as the temperature at which a thermally-responsive (heat-sensitive) record material produces a colored image of sufficient intensity (density). The temperature of imaging varies with the type of application of the thermally-responsive product and the equipment in which the imaging is to be performed. The ability to shift the temperature at which a satisfactorily intense thermal image is produced for any given combination of chromogenic material and developer material is a much sought after and very valuable feature.

Also in the field of thermally-responsive record material, the ability to increase the efficiency of the thermal image formation process has decided advantages. Principal among these is the ability to obtain the same image intensity with a lower amount of reactants or, alternatively, to obtain a more intense image with the same amount of reactants.

Also in the field of thermally-responsive record material, thermally-produced images when subjected to skin oils, for example, may be partially or totally erased.

It is therefore an object of the present invention to provide a record material having improved wet stability.

Another object of the present invention is to provide a record material having improved resistance to solvent desensitization.

Still another object of the present invention is to provide a record material having improved solvent resistance.

Yet another object of the present invention is to provide a record material having improved color-forming efficiency.

It is another object of the present invention to provide a thermally-responsive recording material having enhanced image intensity.

It is also an object of the present invention to provide a thermally-responsive recording material having an improved thermal response.

Finally, it is an object of the present invention to provide a thermally-responsive recording material having enhanced resistance of images to oils.

These and other objects and advantages of the present invention will become more apparent to those skilled in the art from a consideration of the following specification and claims.

In accordance with the present invention, it has been found that these and other objectives may be attained by employing a record material which comprises color developer material comprising a homogeneous mixture of a color developer containing at least about 3.4 weight percent phenolic group, divalent zinc, and an aromatic carboxylate component, wherein the aromatic carboxylic acid or mixture of acids corresponding to said aromatic carboxylate component possesses an octanol/water partition coefficient of about 2.9 or greater and said color developer material possesses a color-forming efficiency of about 95 or greater and a solvent resistance greater than about 30 percent.

A color developer material of the present invention possesses several unexpectedly superior properties compared to teachings of the prior art.

The aromatic carboxylate component can be either a single aromatic carboxylate anion or a mixture of two or more aromatic carboxylate anions, so long as the required characteristics of the components and the resulting color developer material are maintained.

The octanol/water partition coefficient of a chemical is defined as the ratio of that chemical's concentration in the octanol phase to its concentration in the aqueous phase of a two-phase octanol/water system, usually at room temperature. Octanol/water partition coefficients can be derived by modification of a measured value for a structurally related compound using empirically derived atomic or group fragment constants (f) and structural factors (F) according to the following relationship:

$$\log K_{ow}\text{(new chemical)} = \log K_{ow}\text{(similar chemical)} \pm \text{fragments (f)} \pm \text{factors (F)}$$

There is no requirement, in processes used to make the color developer of the present invention, to perform said process in the presence of either water or a base.

The homogeneous mixture of the present invention can be prepared by any appropriate method including, but not limited to, co-melting, dissolving in a common solvent or solvent mixture, etc.

The color developer containing a phenolic group can be any appropriate color developer including, but not limited to, an addition product of phenol and a diolefinic alkylated or alkenylated cyclic hydrocarbon (U.S. Pat. No. 4,573,063), a glass comprising a biphenol color developer and a resinous material (U.S. Pat. No. 4,546,365), or a phenol-aldehyde polymeric material (U.S. Pat. No. 3,672,935).

The weight percent phenolic group of the color developer can be measured and/or calculated by any appropriate method. For example, when addition products of phenol and a diolefinic alkylated or alkenylated cyclic hydrocarbon are subjected to Fourier transform infrared (FTIR) spectroscopy, a quantitative determination of the phenolic group content can be obtained from the infrared spectra. In such a procedure, the infrared spectra of solutions of the addition products in the concentration range of about 1 to 10 milligrams per milliliter are taken and the integrated peak area of the free hydroxyl band is computed and converted to weight percent phenolic group from a calibration curve.

For a glass comprising a biphenol color developer and a resinous material, the weight percent phenolic group can be calculated, for example, from the quantities of biphenol and resinous material used in the glass.

For phenol-aldehyde polymeric material, the weight percent phenolic group can be calculated, for example, using the knowledge of the particular phenol or phenols used in the polymeric material and the elemental analysis of the material.

The aromatic carboxylate(s) can be optionally substituted with one or more groups such as, without limitation, alkyl, aryl, halo, hydroxy, amino, etc., so long as the required octanol/water partition coefficient of the corresponding aromatic carboxylic acid(s) and other critical properties of the corresponding color developer material are achieved.

A preferred method for preparing the color developer material of the present invention comprises mixing together and heating an appropriate color developer comprising a phenolic group, appropriate aromatic carboxylic acid(s) and at least one zinc compound.

The mixing ratio of the color-developer, the aromatic carboxylic acid(s) and the zinc compound are not particularly critical and may be determined without undue experimentation by those skilled in the art. Divalent zinc may suitably be in the range of about 2.4 to about 4.8 weight percent of the amount of the color developer material. The zinc compound may be suitably employed with the aromatic carboxylic acid(s) in the molar ratio range of about 1:4 to 1:2, preferably at a ratio of about 1:2.

The heating temperature and time are not particularly critical and may be determined without undue experimentation by those skilled in the art. The heating temperature is preferably 90° C. or greater. The purpose of the heating is to melt at least one ingredient which, in combination with the mixing, will result in a homogeneous (uniformly dispersed) composition.

The mixing and heating device is not critical and may be any appropriate batch or continuous apparatus. It is important, however, to mix and heat the mixture uniformly in order to produce a homogeneous composition.

The following examples are given merely as illustrative of the present invention and are not to be considered as limiting. All percentages and parts throughout the application are by weight unless otherwise specified.

Since the purpose of a color developer material is to produce a colored image in record material when brought into reactive contact with a color former, the efficiency with which this color-forming reaction is accomplished is the feature of new color developer material candidates which is initially of primary importance. Thus, the first step in the determination of eligible candidates under the selection method for the color developer materials of the present invention consists of a method for establishing color-forming efficiency of a record material comprising the color developer material. The method used to evaluate color-forming efficiency was as follows:

A CB sheet comprising a coating of the composition substantially as listed in Table 1 is placed in coated side-to-coated side configuration with each experimental CF sheet and with a CF sheet comprising a metal-modified phenolic resin as disclosed in U.S. Pat. No. 4,612,254. Each CB-CF pair is imaged in duplicate at the lowest and at the highest pressure settings in an IBM Model 65 typewriter using a solid block character. The intensity of the typed area is a measure of color development on the CF sheet, is measured by means of a reflectance reading using a Bausch & Lomb Opacimeter and is reported as the ratio of the reflectance of the typed area to the background reflectance of the CF paper ($I/I_o$), expressed as a percentage. Each $I/I_o\%$ value is then converted to the Kubelka-Munk function. Image intensity expressed in $I/I_o\%$ terms is useful for demonstrating whether one image is more or less intense than another However, when it is desired to express print intensity in terms proportional to the quantity of color present in each image, the reflectance ratio, $I/I_o$, must be converted to another form. The Kubelka-Munk (K-M) function has been found useful for this purpose. Use of the K-M function as a means of determining the quantity of color present is discussed in TAPPI, *Paper Trade Journal,* pages 13–38 (Dec. 21, 1939).

Each typed area is then analyzed spectrophotometrically for the amount of color former per unit area. A least squares regression equation is then obtained for each image K-M function versus the amount color former per unit area for the corresponding image area. From the least squares regression equation for each of the couplets, the K-M function corresponding to 11 micrograms of color former per square centimeter is calculated. This calculated value for each of the CF's of the color developer material candidates is divided by the corresponding K-M function for the CF sheet comprising a metal-modified phenolic resin as disclosed in U.S. Pat. No. 4,612,254, and the resulting ratio is expressed as a percentage. A value of about at least 95 is required in order to provide the unexpected balance of properties of the color developer material of the present invention.

TABLE 1

| Material | Parts, Dry |
|---|---|
| Microcapsules | 73.6 |
| Corn Starch Binder | 6.3 |
| Wheat Starch Particles | 19.4 |

TABLE 1-continued

| Material | Parts, Dry |
|---|---|
| Soybean protein binder | 0.7 |

The microcapsules employed in Table 1 contained the color former solution of Table 2 within capsule walls comprising synthetic resins produced by polymerization methods as taught in U.S. Pat. No. 4,552,811.

TABLE 2

| Material | Parts, Dry |
|---|---|
| 3,3-bis(p-dimethylaminophenyl)-6-dimethylaminophthalide (Crystal Violet Lactone) | 2.00 |
| 3,3-bis(1-octyl-2-methylindol-3-yl)phthalide | 0.60 |
| 3-diethylamino-6-methyl-7-(2',4'-dimethylanilino) fluoran (U.S. Pat. No. 4,330,473) | 0.30 |
| sec-butylbiphenyl (U.S. Pat. No. 4,287,074) | 63.12 |
| $C_{11}$-$C_{15}$ aliphatic hydrocarbon | 33.98 |

As mentioned, supra, carbonless copy paper systems of the type which are one of the subjects of the present invention utilize a reaction in solution for their color-forming function. Thus, in order to have the capability to produce a reasonably intense image, the color developer composition must necessarily have sufficient solubility in the color former solvent. Since the unexpectedly improved properties of the color developer composition are based, at least in part, on available zinc, maximum solubility of the zinc component in the color former solvent is also important. Applicants have found that a good method of establishing this zinc component color former solvent solubility can be accomplished by dissolving the color developer material in toluene and determining the weight percent soluble zinc component through a spectrophotometric method. Applicants have further found, unexpectedly, that the use of a certain aromatic carboxylate component provides the required toluene solubility of the zinc component while providing other required properties for a substantially enhanced color developer composition.

The next property in the evaluation program for those compositions possessing acceptable color-forming efficiency is the retention of organic solvent solubility of the zinc component while the developer composition is in contact with water. This feature is the wet stability previously mentioned, supra. Applicants have found that the amount of zinc remaining in solution after contact with water can be unexpectedly maximized by utilizing an aromatic carboxylate component wherein the aromatic carboxylic acid or mixture of acids corresponding to said aromatic carboxylate component possesses an octanol/water partition coefficient of about 2.9 or greater.

The next step in the evaluation program for those compositions possessing acceptable color-forming efficiency and acceptable octanol/water partition coefficient is to evaluate the resistance of the color developer composition to suppression of image formation by a typical color former solvent (solvent resistance). Applicants have found that a useful test for evaluating the degree of suppression of image formation consists of the following steps: A 10 ml. solution of 1:9 xylene:toluene (by volume), $4\times10^{-4}$ molar 3,3-bis(4-dimethylaminophenyl)-6-dimethylaminophthalide (crystal violet lactone color former) and an amount of color developer material equal to 10 times, by weight, the amount of crystal violet lactone is prepared. A 0.3 ml. portion of the above solution is added to Whatman No. 1 filter paper (performed in triplicate), the solvent is allowed to evaporate and the intensity of the image is measured after about one hour and reported as color difference. To the remaining 9.1 ml. of the initial solution is added 0.1 ml. of benzylated xylene (U.S. Pat. No. 4,130,299) and the above-described procedure of applying a portion of the solution to filter paper, allowing the solvent to evaporate and the image to develop and the measurement of the intensity is repeated. Solvent resistance is reported as the ratio of the color difference of the image formed from the solution containing benzylated xylenes to the color difference of the image formed from the initial solution, expressed as a percentage.

The Hunter Tristimulus Colorimeter was used to measure color difference, a quantitative representation of the ease of visual differentiation between the intensities of the colors of two specimens. The Hunter Tristimulus Colorimeter is a direct-reading L, a, b instrument. L, a, b is a surface color scale (in which "L" represents lightness, "a" represents redness-greenness and "b" represents yellowness-blueness) and is related to tne CIE tristimulus values, X, Y and Z, as follows:

$$L = 10Y^{\frac{1}{2}}$$

$$a = \frac{17.5[X/0.98041) - Y]}{Y^{\frac{1}{2}}}$$

$$b = \frac{7.0[Y - Z/1.18103)]}{Y^{\frac{1}{2}}}$$

The magnitude of total color difference is represented by a single number, $\Delta E$, and is related to L, a, b values as follows:

$$\Delta E = [(\Delta L)^2 + (\Delta a)^2 + (\Delta b)^2]^{\frac{1}{2}}$$

where $\Delta L = L_1 - L_o$ $\Delta a = a_1 - a_o$ $\Delta b = b_1 - b_o$ $L_1$, $a_1$, $b_1$ = object for which color difference is to be determined.

$L_o$, $a_o$, $b_o$ = reference standard.

The above-described color scales and color differences measurements are described fully in Hunter, R.S., *The Measurement of Appearance*, John Wiley & Sons, New York, 1975.

A solvent resistance value greater than about 30 percent is required in order to provide the unexpected balance of properties of the color developer material of the present invention.

The final step in the evaluation program for those color developer compositions possessing acceptable color-forming efficiency, acceptable octanol/water partition coefficients and acceptable solvent resistance is to evaluate solvent desensitization (CFB effect) on a record material containing the color developer composition.

In this test a CB sheet comprising a coating of the composition listed in Table 3 is placed in coated side-to-coated side configuration with a CF sheet comprising a zinc-modified phenolic resin as disclosed in U.S. Pat. Nos. 3,732,120 and 3,737,410 and the resulting CB-CF pair is subjected to a calender intensity (CI) test. In the CI test a rolling pressure is applied to a CB-CF pair rupturing microcapsules on the CB sheet, transferring color former solution to the CF sheet and forming an image on the CF sheet. In the CI test there is a portion of the color former solution on the CB sheet, released during microcapsule rupture, which is not transferred to the CF sheet. It is this sheet, hereinafter referred to as a ruptured CB sheet, which is the test sheet for the solvent desensitization test.

TABLE 3

| Material | Parts, Dry |
|---|---|
| Microcapsules | 81.9 |
| Corn Starch Binder | 3.6 |
| Wheat Starch Particles | 14.5 |

The microcapsules employed in Table 3 contained the color former solution of Table 4 within capsule walls comprising synthetic resins produced by polymerization methods as taught in U.S. Pat. No. 4,001,140.

TABLE 4

| Material | Parts, Dry |
|---|---|
| 3,3-bis(p-dimethylaminophenyl)-6-dimethylaminophthalide (Crystal Violet Lactone) | 1.70 |
| 3,3-bis(1-octyl-2-methylindol-3-yl)phthalide | 0.55 |
| 2'-anilino-3'-methyl-6'-diethylaminofluoran (U.S. Pat. No. 3,746,562) | 0.55 |
| benzylated xylenes (U.S. Pat. No. 4,130,299) | 34.02 |
| $C_{10}$–$C_{13}$ alkylbenzene | 34.02 |
| $C_{11}$–$C_{15}$ aliphatic hydrocarbon | 29.16 |

Ruptured CB sheets, supra, are then placed in coated side-to-coated side configuration with each of the CF sheets of Table 7, the couplets are placed between two superimposed panes of glass and the couplet-glass sandwich is placed in an oven at about 50° C. for 24 hours.

The CF sheets of Table 7, before (control) and after (sample) storage against the ruptured CB, are tested in a Typewriter Intensity (TI) test with the same type of CB sheet as used in the CI test.

In the TI test a standard pattern is typed on a coated side-to-coated side CB-CF pair. Each image is immediately measured using the Hunter Tristimulus Colorimeter.

The Hunter L, a, b scale, previously defined, supra, was designed to give measurements of color units of approximate visual uniformity throughout the color solid. Thus, "L" measures lightness and varies from 100 for perfect white to zero for black, approximately as the eye would evaluate it. The chromaticity dimensions ("a" and "b") give understandable designations of color as follows:

"a" measures redness when plus, gray when zero and greenness when minus

"b" measures yellowness when plus, gray when zero and blueness when minus

In the solvent desensitization test the purpose is to measure the degree of retention of ability of the sample CF to produce an image as compared to the control sample of the same CF at a given time. Since the color of the image in this test is predominantly blue, it is appropriate to evaluate the TI images by means of the "b" chromaticity dimension. The following was used to calculate the intensity of the appropriate image:

$\Delta b_s = b_s - b_{os}$ and $\Delta b_c = b_c - b_{oc}$ where $b_s$ = sample image $b_{os}$ = unimaged area of sample $b_c$ = control image $b_{oc}$ = unimaged area of control Solvent desensitization is then calculated as follows:

$$\frac{\Delta b_s}{\Delta b_c} \times 100$$

A series of color developer materials was made substantially according to the following two step process. In the first step, a zinc complex compound was prepared by dissolving an aromatic carboxylic acid or a mixture of aromatic carboxylic acids in toluene. A quantity of zinc oxide, such that the resulting total molar ratio of the mixed acids to the zinc oxide was 2:1, usually along with a small amount of water, was added to the mixed acid solution and the resulting mixture was heated with stirring. The reaction was continued until UV reflectance analysis indicated the absence of zinc oxide. Sometimes it was necessary to add additional water to achieve this. Once analysis indicated the absence of zinc oxide, the water was azeotropically removed and the mixture was evaporated to dryness under vacuum.

In the second step of the process, the dry zinc complex compound was added, with stirring, to a heated, molten phenolic color developer in the amount of about 2.4 weight percent divalent zinc and the resulting composition was cooled to produce an amorphous solid. The phenolic color developer employed was a terpene-phenol addition product with about 27.2 weight percent phenolic group. The color developer compositions of Examples 2, 4, 6 and 9 of Table 6 additionally employed $NH_4OH$ in the second step of the process.

The resulting color developer material was crushed and dispersed at 25.8% solids in water, a polyvinyl alcohol solution and a small amount of dispersant in an attritor for about 45 minutes according to the amounts listed in Table 5.

TABLE 5

| Material | Parts, dry |
|---|---|
| color developer material | 40.00 |
| polyvinyl alcohol solution (20% solids) | 7.04 |
| di-tertiary acetylene glycol | 0.19 |
| sulfonated castor oil | 0.05 |

The resulting dispersion was then formulated into a coating mixture with the materials and dry Parts listed in Table 6.

TABLE 6

| Material | Parts, Dry |
|---|---|
| color developer material dispersion (25.8% solids) | 17.7 |
| polyvinyl alcohol solution (20% solids) | 15.4 |
| calcined kaolin clay | 9.6 |
| kaolin clay slurry (70% solids) | 57.2 |

Sufficient water was added to the composition of Table 6 to produce a 25% solids mixture. The coating mixture was applied to a paper substrate with a #12 wire-wound coating rod and the coating was air dried.

The record material sheets (CF sheets) prepared are listed in Table 7, along with the corresponding aromatic carboxylic acid or mixture of aromatic carboxylic acids employed. Also listed in Table 7 are the corresponding results for color-forming efficiency and, where appropriate, Log $K_{ow}$ of the aromatic carboxylic acid or acid mixture and solvent resistance. Each of these results was obtained substantially as described, supra.

TABLE 7

| Example | Aromatic Carboxylic Acid(s) | Color-Forming Efficiency | Log $K_{ow}$ of Acid(s) | Solvent Resistance % |
|---|---|---|---|---|
| 1 | benzoic acid | 21.2 | | |
| 2 | benzoic acid with ammonium compound | 95.3 | 1.87 | |
| 3 | p-tert-butylbenzoic acid | 23.7 | | |
| 4 | p-tert-butylbenzoic acid with ammonium compound | 87.0 | | |
| 5 | salicylic acid | 6.4 | | |
| 6 | salicylic acid with ammonium compound | 5.7 | | |
| 7 | p-benzoylbenzoic acid | 103 | 2.92 | 72.1 |
| 8 | benzoic acid salicylic acid | 67.6 | | |
| 9 | benzoic acid salicylic acid with ammonium compound | 85.6 | | |
| 10 | 2,6-dimethoxybenzoic acid p-tert-butylbenzoic acid | 31.2 | | |
| 11 | p-cyclohexylbenzoic acid p-tert-butylbenzoic acid | 103 | 4.35 | 22.4 |
| 12 | salicylic acid p-tert-butylbenzoic acid | 98.9 | 3.06 | 66.2 |
| 13 | benzoic acid p-tert-butylbenzoic acid | 104 | 2.86 | 25.5 |
| 14 | p-benzoylbenzoic acid p-tert-butylbenzoic acid | 98.4 | 3.37 | 57.4 |
| 15 | N-phenylanthranilic acid p-tert-butylbenzoic acid | 101 | 3.82 | 61.9 |
| 16 | N-methylanthranilic acid p-tert-butylbenzoic acid | 74.7 | | |
| 17 | N-benzylanthranilic acid p-tert-butylbenzoic acid | 27.0 | | |
| 18 | 5-tert-octylsalicylic acid | 104 | 6.18 | 96.9 |
| 19 | p-cyclohexylbenzoic acid | 105 | 4.85 | 16.9 |
| 20 | p-benzoylbenzoic acid p-cyclohexylbenzoic acid | 104 | 3.89 | 42.0 |
| 21 | N-phenylanthranilic acid | 83.7 | | |

It is readily apparent from the data of Table 7 that record material which comprises color developer material comprising a homogeneous mixture of color developer containing about 27.2 weight percent phenolic group, divalent zinc, and an aromatic carboxylate component, wherein the aromatic carboxylic acid or mixture of acids corresponding to said aromatic carboxylate component possesses an octanol/water partition coefficient of about 2.9 or greater and said color developer material possesses a color-forming efficiency of about 95 or greater and a solvent resistance greater than about 30 percent produces unexpectedly superior results.

A series of examples was prepared for the purpose of determining the relationship between weight percent phenolic group of the color developer contained in a color developer material and solvent desensitization of a record material containing the color developer material. The color developer materials of these examples were made by the following procedure:

Individual mixtures were made of a mixture of 80 parts of zinc oxide, 160 parts of ammonium bicarbonate, 200 parts of p-tert-butylbenzoic acid and 240 parts of 5 tert-octylsalicylic acid with each of the pairs of amounts of terpene-phenol addition product and poly(alpha-methylstyrene), hereinafter referred to as polystyrene, listed in Table 8. The ingredients were preblended as a dry mix and this mix was then processed by means of two passes through a Baker Perkins MPC/V-50 twin-screw continuous mixer with the zone 1 heater set at 150° F. and the zone 2 heater set at 320° F. The continuous mixer was fitted with a volumetric feeder and a chill roll-kibbler for chilling and flaking the output of the mixer. The feed rate into the mixer was about 0.6 to about 0.8 lb. per minute.

The record material sheets (CF sheets), prepared by substantially the same procedures as used for Examples 1-21, are listed in Table 8 along with the corresponding amounts of terpene-phenol addition product and polystyrene, the weight percent phenolic group in the color developer (addition product plus polystyrene), the color-forming efficiency of the color developer material and the solvent desensitization of the record material sheet. The color-forming efficiency and the solvent desensitization of the record material sheet were determined by methods previously described.

TABLE 8

| Example | Parts of terpene-phenol Addition Product | Parts of Polystyrene | Color-Forming Efficiency | Weight Percent Phenolic Group | Solvent Desensitization |
|---|---|---|---|---|---|
| 22 | 1361 | 454 | 104 | 20.4% | 79.0* |
| 23 | 1134 | 680 | 107 | 17.0% | 72.1* |
| 24 | 907 | 907 | 107 | 13.6% | 67.0* |

TABLE 8-continued

| Example | Parts of terpene-phenol Addition Product | Parts of Polystyrene | Color-Forming Efficiency | Weight Percent Phenolic Group | Solvent Desensitization |
|---|---|---|---|---|---|
| 25 | 680 | 1134 | 105 | 10.2% | 67.4* |
| 26 | 454 | 1361 | 103 | 6.8% | 59.0* |
| 27 | 227 | 1588 | 99 | 3.4% | 57.8 |
| 28 | 0 | 1814 | 59 | 0.0% | 17.0 |

*Average of two determinations.

It is readily apparent from the data of Table 8 that record material possessing the materials and properties previously recited (page 19) and which additionally comprises a color developer containing at least about 3.4 weight percent phenolic group, possesses unexpectedly improved solvent desensitization.

A series of examples was prepared for the purpose of determining the effect of different levels of ammonium compound present during the process of making the color developer material and to determine the amount of water present in the color developer material product. The color developer materials of these examples were made by the following procedure. To about 2270 parts of a heated, molten terpene-phenol addition product (about 30 weight percent phenolic group) made substantially according to the procedure of U.S. Pat. No. 4,573,063, were added, slowly, a mixture of 100 parts of zinc oxide, 100 parts of benzoic acid, 150 parts p-tert-butylbenzoic acid, 200 parts of 5-tert-octylsalicylic acid and the corresponding parts of ammonium bicarbonate listed in Table 9. The temperature of the mixture was maintained, with stirring, for about one hour or until transparent, and then the mixture was allowed to cool. The resulting color developer material was poured into a cooling tray, subsequently crushed and dispersed in water. The dispersion was formulated into a coating mixture and the coating mixture was applied to a paper substrate and dried by substantially the same procedures as used for Examples 1-21.

TABLE 9

| Example | Parts of Ammonium Bicarbonate | Color-Forming Efficiency | 20 min. $\Delta b_s$ | Weight % Water in Color Developer Material* |
|---|---|---|---|---|
| 29 | 100 | 111 | −44.64 | 0.24 |
| 30 | 50 | 112 | −42.79 | 0.14 |
| 31 | 25 | 113 | −42.59 | 0.40 |
| 32 | 0 | 114 | −42.82 | 0.37 |

*Average of two determinations.

It is readily apparent from the data of Table 9 that in record material possessing the materials and properties previously recited (pages 19 and 20) there is no requirement that either an ammonium compound or a critical amount of water be present during the process of preparing the color developer material.

A series of examples was prepared for the purpose of determining the performance of the color developer material of the present invention in thermal record material.

To about 2270 parts of a heated, molten terpene-phenol addition product (about 30 weight percent phenolic group), made substantially according to U.S Pat. No. 4,573,063, were added, slowly, a mixture of 125 parts of zinc oxide, 125 parts of ammonium bicarbonate, 125 parts of benzoic acid, 187.5 parts of p-tert-butylbenzoic acid and 250 parts of 5-tert-octylsalicylic acid. The temperature of the mixture was maintained with stirring until transparent (about one hour). The resulting color developer material (No. B-1) was poured into a cooling tray and, subsequent to hardening, crushed.

In each of the examples illustrating heat-sensitive record material of the present invention a dispersion of a particular system component was prepared by milling the component in an aqueous solution of the binder until a particle size of between about 1 micron and 10 microns was achieved. The milling was accomplished in an attritor, small media mill, or other suitable dispersing device. The desired average particle size was about 1-3 microns in each dispersion.

In these examples separate dispersions comprising the chromogenic compound (Component A), the acidic developer material (Component 8), the sensitizer (Component C) and other (Component D) materials were prepared.

| Material | Parts |
|---|---|
| Component A | |
| 3-diethylamino-6-methyl-7-anilinofluoran | 64.14 |
| Binder, 20% polyvinyl alcohol in water | 54.85 |
| Water | 74.04 |
| Defoamer & dispersing agent* | 0.57 |
| Surfynol 104, 5% solution in isopropyl alcohol | 6.40 |
| Component B-1 | |
| Color developer material No. B-1 | 17.00 |
| Binder, 20% polyvinyl alcohol in water | 15.00 |
| Water | 67.88 |
| Defoamer & dispersing agent* | 0.12 |
| Component B-2 | |
| Color developer material according to Japanese Patent Disclosure No. 62-19486 (69% solids) | 25.00 |
| Binder, 20% polyvinyl alcohol in water | 15.00 |
| Water | 59.88 |
| Defoamer & dispersing agent* | 0.12 |
| Component C | |
| 1,2-diphenoxyethane | 44.63 |
| Binder, 20% polyvinyl alcohol in water | 38.06 |
| Water | 67.05 |
| Defoamer & dispersing agent* | 0.26 |
| Component D | |
| Zinc stearate | 34.00 |
| Binder, 20% polyvinyl alcohol in water | 29.00 |
| Water | 136.80 |
| Defoamer & dispersing agent* | 0.50 |

*A mixture of the defoamer Nopko NDW (sulfonated caster oil produced by Nopko Chemical Company) and the dispersing agent Surfynol 104 (a di-tertiary acetylene glycol surface agent produced by Air Products and Chemicals Inc.) was employed.

Mixtures of dispersions A, B and D and dispersions of A, B, C and D were made. In all cases the following materials were added to the resulting mixtures:

1. Micronized silica (designated hereinbelow as silica)
2. A 10% solution of polyvinyl alcohol in water (designated hereinbelow as PVA)
3. Water In Table 10 are listed each of these mixtures, including the components added and the parts by weight of each.

Each mixture of Table 10 was applied to paper and dried, yielding a dry coat weight of about 5.2 2to about 5.9 gsm.

TABLE 10

| Example | Components | Parts |
|---|---|---|
| 33 | Dispersion A | 0.53 |
| | Dispersion B-1 | 7.00 |
| | Dispersion D | 1.00 |
| | Silica | 0.40 |
| | PVA | 2.80 |
| | Water | 6.80 |
| 34 | Dispersion A | 0.53 |
| | Dispersion B-2 | 7.00 |
| | Dispersion D | 1.00 |
| | Silica | 0.40 |
| | PVA | 2.80 |
| | Water | 6.80 |
| 35 | Dispersion A | 0.53 |
| | Dispersion B-1 | 3.50 |
| | Dispersion C | 2.00 |
| | Dispersion D | 1.00 |
| | Silica | 0.40 |
| | PVA | 2.80 |
| | Water | 8.30 |
| 36 | Dispersion A | 0.53 |
| | Dispersion B-2 | 3.50 |
| | Dispersion C | 2.00 |
| | Dispersion D | 1.00 |
| | Silica | 0.40 |
| | PVA | 2.80 |
| | Water | 8.50 |

The thermally-sensitive record material sheets coated with one of the mixtures of Table 10 were imaged by contacting the coated sheet with a metallic imaging block at the indicated temperature for 5 seconds. The intensity of each image was measured by means of a reflectance reading using a Macbeth reflectance densitometer. A reading of 0 indicates no discernable image. The intensity of each image is a factor, among other things, of the nature and type of chromogenic compound employed. A value of about 0.9 or greater usually indicates good image development. The intensities of the images are presented in Table 11.

TABLE 11

| | Reflectance Density of Image Developed at Indicated Fahrenheit Temperature | | | | | | | | | | |
|---|---|---|---|---|---|---|---|---|---|---|---|
| Example | 300° | 275° | 260° | 245° | 230° | 215° | 200° | 185° | 170° | 155° | 140° |
| 33 | 1.40 | 1.29 | 1.13 | 0.93 | 0.55 | 0.19 | 0.08 | 0.05 | 0.05 | 0.05 | 0.05 |
| 34 | 1.05 | 0.70 | 0.48 | 0.35 | 0.09 | 0.04 | 0.03 | 0.03 | 0.03 | 0.03 | 0.03 |
| 35 | 1.46 | 1.40 | 1.40 | 1.44 | 1.46 | 1.38 | 1.37 | 1.31 | 1.24 | 0.29 | 0.09 |
| 36 | 1.28 | 1.23 | 1.24 | 1.26 | 1.26 | 1.23 | 1.16 | 1.01 | 0.38 | 0.06 | 0.03 |

The background coloration of each of the thermally-sensitive record material sheets was determined before calendering and after calendering. The intensity of the background coloration was measured by means of a reflectance reading using a Bausch & Lomb Opacimeter. A reading of 92 indicates no discernable color and the higher the value the less background coloration. The background data are entered in Table 12.

TABLE 12

| | Background Intensity | |
|---|---|---|
| Example | Uncalendered | Calendered |
| 33 | 85.5 | 84.4 |
| 34 | 86.1 | 81.7 |
| 35 | 84.4 | 83.1 |
| 36 | 82.9 | 81.7 |

From the data of Tables 11 and 12 it is readily apparent that thermally-responsive recording materials comprising the developer materials of the present invention produce substantially enhanced image intensities and/or enhanced thermal sensitivity and/or improved background coloration compared to corresponding thermally-responsive recording material comprising previously known developer material.

The invention being thus described, it will be obvious that the same may be varied in many ways. Such variations are not to be regarded as a departure from the spirit and scope of the invention, and all such modifications are intended to be included within the scope of the following claims.

What is claimed:

1. Color developer material comprising a homogeneous mixture of:

(a) a color developer containing at least about 3.4 weight percent phenolic group, (b) divalent zinc, and (c) an aromatic carboxylate component, wherein the aromatic carboxylic acid or mixture of acids corresponding to said aromatic carboxylate component possesses an octanol/water partition coefficient of about 2.9 or greater and said color developer material possesses a color-forming efficiency of about 95 or greater and a solvent resistance greater than about 30 percent.

2. The color developer material of claim 1 wherein the color developer is an addition product of phenol and a diolefinic alkylated or alkenylated cyclic hydrocarbon.

3. The color developer material of claim 3 wherein the weight percent phenolic group of said color developer is at least 20.4.

4. The color developer material of claim 3 wherein the aromatic carboxylic acid is p-benzoylbenzoic acid or 5-tert-octylsalicyclic acid.

5. The color developer material of claim 4 wherein said color developer material further includes p-tert-butylbenzoic acid or p-cyclohexylbenzoic acid.

6. A color developer material prepared by a process which comprises:

heating a mixture of a color developer containing at least about 3.4 weight phenolic group.

divalent zinc, and an aromatic carboxylic acid or mixture or acids, wherein said aromatic carboxylic acid or mixture or acids possesses an octanol/water partition coefficient of about 2.9 or greater and said color developer material possesses a color forming efficiency of about 95 or greater and a solvent resistance greater than about 30 percent.

7. The color developer material of claim 6 wherein the color developer is an addition product of phenol and a diolefinic alkylated or alkenylated cyclic hydrocarbon.

8. The color developer material of claim 7 wherein the weight percent phenolic group of said color developer is at least 20.4.

9. The color developer material of claim 8 wherein the aromatic carboxylic acid is p-benzoylbenzoic acid or 5-tert-octylsalicylic acid.

10. The color developer material of claim 9 wherein said color developer material further includes p-tert-butylbenzoic acid or p-cyclohexylbenzoic acid.

11. The color developer material of claim 10 wherein the process is performed in the presence of an ammonium compound.

12. The color developer material of claim 11 wherein the ammonium compound is ammonium bicarbonate, ammonium carbonate or ammonium hydroxide.

13. The color developer material of claim 6 wherein the source of divalent zinc is zinc oxide.

14. The color developer material of clam 13 wherein the color developer is an additional product of phenol and a diolefinic alkylated or alkenylated cyclic hydrocarbon.

15. The color developer material of claim 14 wherein the aromatic carboxylic acid is p-benzoylbenzoic acid or 5-tert-octylsalicyclic acid.

16. The color developer material of claim 15 wherein said color developer material further includes p-tert-butylbenzoic acid or p-cyclohexylbenzoic acid.

17. The color developer material of claim 16 wherein the process is performed in the presence of an ammonium compound.

18. The color developer material of claim 17 wherein the ammonium compound is ammonium bicarbonate, ammonium carbonate or ammonium hydroxide.

* * * * *